Oct. 31, 1967     G. W. COPE     3,350,066

FENCE STRUCTURE AND PROP ELEMENT FOR FENCE WIRES

Filed Aug. 9, 1965

INVENTOR
Glenn W. Cope

BY   *B. P. Fishburn Jr.*

ATTORNEY

United States Patent Office 3,350,066
Patented Oct. 31, 1967

3,350,066
FENCE STRUCTURE AND PROP ELEMENT FOR FENCE WIRES
Glenn W. Cope, Box 44, Cope, S.C. 29038
Filed Aug. 9, 1965, Ser. No. 478,037
3 Claims. (Cl. 256—32)

This invention relates to improvements in fences, and more particularly to wire fences of the electrified or non-electrified types and to a prop for supporting the wires of such fences between the main posts thereof.

Customarily, in the construction of wire fences for enclosing large plots, permanent posts are anchored in the ground every twenty to thirty feet and the wire strands are attached to these posts. This conventional construction is quite expensive and requires quite a bit of labor. Additionally, with the rather close spacing of the fence posts, it is difficult, if not impossible, to cut weeds adjacent the fence with a tractor-driven mower of the sickle bar type, and not infrequently the fence becomes engulfed in brush and weeds.

The objective of this invention is to provide a fence structure which will significantly reduce the cost and labor in erecting wire fences of the electric or non-electric types and which will enable a tractor-driven mower to cut the weeds and grass along and directly under the fence line.

Another object of the invention is to provide a novel prop for supporting the fence wires intermediate the permanent posts so that the latter may be spaced relatively great distances apart, up to 400–600 feet, in some cases.

Another object is to provide a prop for fence wires which is so constructed that it will stabilize and support the wires while allowing a sickle bar type mower to pass easily thereunder.

Another object is to provide a prop of the mentioned type including means for quickly attaching the prop to fence wires securely and detachably.

Other objects and advantages of the invention will be apparent during the course of the following detailed description.

In the accompanying drawings forming a part of this application and in which like numerals are employed to designate like parts throughout the same, FIGURE 1 is a perspective view of a fence constructed in accordance with the invention, parts broken away;

Figure 1:
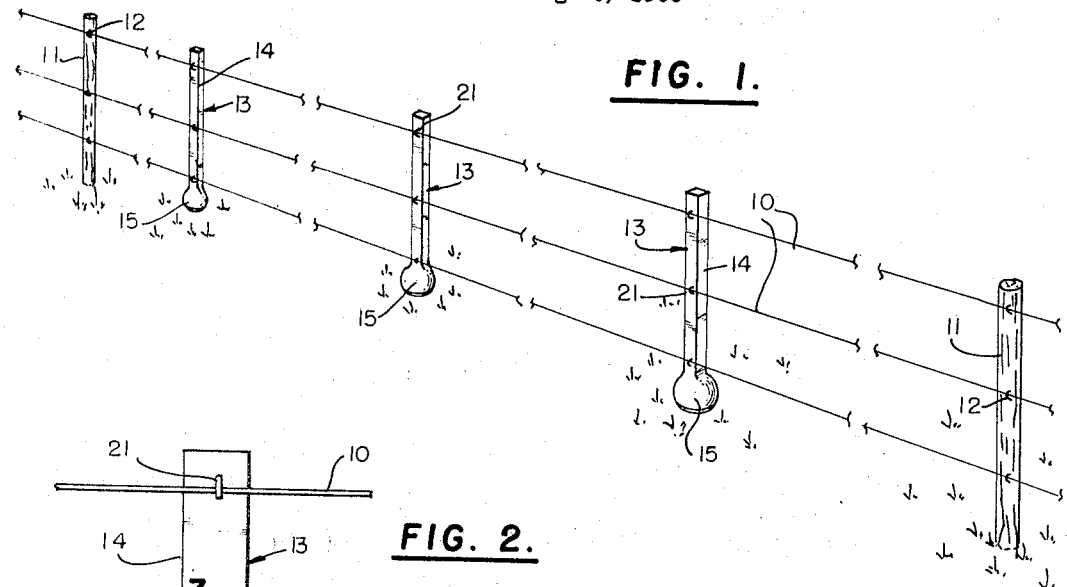
Figure 2:
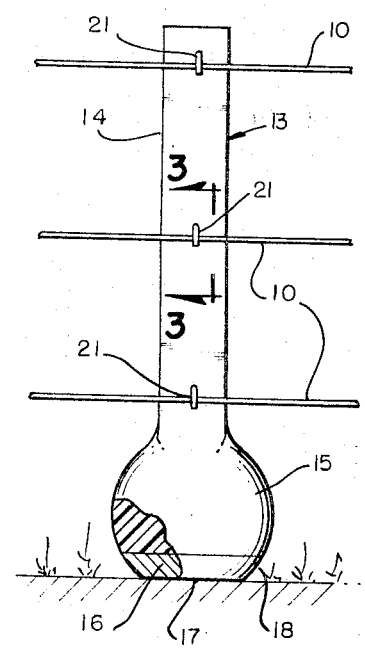
FIGURE 2 is an enlarged fragmentary side elevational view of the fence showing in particular one of the props in accordance with the invention.
Figure 3:
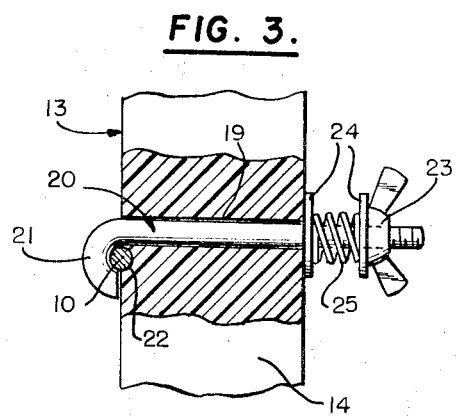
FIGURE 3 is an enlarged fragmentary vertical section taken on line 3—3 of FIGURE 2.

In the drawings wherein for the purpose of illustration are shown preferred embodiments of the invention, attention is directed first to FIGURE 1 depicting a section of fence of indeterminate length including fence wires 10 which may be electrified or non-electrified. The spaced horizontal wires 10 are supported at spaced intervals by main posts 11 which are firmly anchored in the ground in a conventional manner. The posts 11 may be wooden, concrete or any other conventional sturdy material.

In accordance with one of the main objectives of the invention, the main or permanent posts 11 may be spaced apart by as much as 400–600 feet and this distance may be varied in some installations depending upon the strength and permanency desired for the fence. In all cases, however, the spacing of the posts 11 will be many times greater than the customary 25–30 feet in conventional wire fences. The wires 10 are attached to the main posts 11 in a conventional manner, as indicated at 12, and the wires may be rendered taut by the use of conventional means.

Intermediate each pair of main posts 11, FIGURE 1, the required number of props 13 according to the invention are employed for supporting and stabilizing the wires 10 so that the latter cannot sag to the ground as would normally occur because of the great distance between the posts 11. It is intended that in a high quality fence of the type under consideration, the spacing of the props 13 will be uniform and will be in the range of every 20–30 feet along the wires 10 between the pair of posts 11.

Each prop 13 is preferably, although not necessarily, molded from plastic so that it will inherently possess insulating properties. However, if desired, the prop could be formed of wood, pressed fiber or other sufficiently sturdy material.

Each prop 13 includes an elongated body portion 14, preferably rectangular in cross section and of sufficient length to support the wires 10 in properly spaced relation. The prop 13 has an integral enlarged head 15 at its bottom adapted to rest upon the ground and preferably, although not necessarily, weighted by a bottom plate 16 of lead or the like having a flat ground-engaging face 17. The weighted head or base 15 provides stability for the prop 13, whereby the latter tends to remain upright, and additionally, the head 15 is preferably spherically rounded so as to provide a generally inclined face 18 therearound near ground level. This construction enables a sickle bar mower, while cutting weeds along the fence, to engage each prop at the inclined face 18 and elevate each prop automatically so that the mower may pass under the same without interruption. By a simple camming action, the prop which is not ground anchored simply rides over the mower and then drops to the ground after the mower passes. This arrangement permits a tractor-driven mower to cut all of the weeds cleanly along the fence line so that the fence will not be engulfed with weeds, as frequently happens to conventional fences having posts anchored in the ground every 20–30 feet apart.

Means are provided on each prop 13 to quickly detachably secure the same to the fence wires 10. This means comprises at a plurality of vertically spaced points on each prop a through opening 19 adapted to receive a bolt 20 having a fence wire embracing hook 21 at one end thereof to clamp the adjacent wire 10 against one side of the prop, and preferably into a shallow recess 22 which may be formed in the prop during manufacturing. The other end of the bolt 20 is screw-threaded for the reception of a winged nut 23 and a pair of flat washers 24. A coil spring 25 surrounds the bolt between the washers 24 and has its tension varied by the winged nut. By this arrangement, the fence wires are resiliently clamped to the prop and may be quickly detached when desired. Quite obviously, as shown in the drawings, the number of bolts 20 on each prop will correspond to the number of fence wires employed. Other types of wire fasteners may be employed with the props, if desired, within the scope of this invention, and the drawings illustrate a preferred arrangement only. Another advantage of the particular wire fastening means shown and described resides in the fact that the props 13 are easily adjusted lengthwise of the wires 10 without complete detachment therefrom and this saves a great deal of time and labor.

Figure 4:
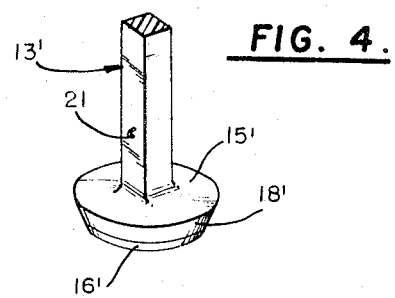
FIGURE 4 is a fragmentary perspective view of a modification.

FIGURE 4 shows a slightly modified form of prop 13' which is employed in the identical manner shown and described for the prop 13. The prop 13' instead of having a spherically rounded lower head or base has a generally flat circular base 15' having a downwardly tapering side wall 18' and a lower weight 16', as indicated. The tapering side wall 18' allows the necessary camming action to cause lifting of the prop 13' by the mower so that the sickle bar may pass under each prop along the fence line. In all other respects, the prop 13' may be identical to the previously-described prop 13 and serves the same purposes during use.

It is believed that the advantages of the invention will not be apparent to those skilled in the art, without the necessity for further description herein.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. A fence structure enabling a mower to cut weeds directly under the fence comprising widely spaced main supporting posts anchored in the ground, horizontal fence wires secured to the main supporting posts and extending therebetween, and a plurality of relatively closely spaced fence wire props between each pair of main posts and secured to the fence wires to prevent sagging thereof, said props provided at their lower ends with integral generally ball-like enlarged stabilizing heads, said heads resting freely upon the ground and being unattached to the ground so that said mower may readily engage and lift the props while passing beneath the fence between the main supporting posts.

2. A fence structure as defined in claim 1, and readily releasable fastener means on said props for detachably connecting the fence wires to the props.

3. A fence structure as defined in claim 1, and wherein the ball-like enlarged heads have bottom flat faces of lesser width than the maximum diameters of the heads.

References Cited
UNITED STATES PATENTS

| | | | |
|---|---|---|---|
| 309,038 | 12/1884 | Flach | 256—48 X |
| 359,604 | 3/1887 | Hanna | 256—55 X |
| 361,223 | 4/1887 | Kelly. | |
| 1,754,712 | 4/1930 | Gartner | 256—54 |
| 2,637,934 | 5/1953 | Manoil | 256—24 X |
| 2,895,717 | 7/1959 | De Falco | 256—25 |

DAVID J. WILLIAMOWSKY, *Primary Examiner.*

HARRISON R. MOSELEY, *Examiner.*

D. L. TAYLOR, *Assistant Examiner.*